United States Patent [19]
Smith et al.

[11] 3,885,056
[45] May 20, 1975

[54] METHOD OF COOKING FOOD PRODUCTS

[75] Inventors: Donald Paul Smith; Raymond E. Booth, both of Dallas, Tex.

[73] Assignee: Donald P. Smith, Dallas, Tex.

[22] Filed: Mar. 2, 1973

[21] Appl. No.: 337,675

Related U.S. Application Data

[62] Division of Ser. No. 209,132, Dec. 17, 1971, Pat. No. 3,731,614.

[52] U.S. Cl. .............. 426/441; 426/467; 426/520; 426/523
[51] Int. Cl. .............................................. A23l 1/00
[58] Field of Search ........... 426/523, 465, 466, 467, 426/520, 468, 469, 438, 441; 99/406, 403, 404, 407, 408; 210/DIG. 8; 126/391

[56] References Cited
UNITED STATES PATENTS

| | | | |
|---|---|---|---|
| 1,565,283 | 12/1925 | Garbee | 426/523 |
| 1,677,364 | 7/1928 | Peebles | 426/523 |
| 2,272,663 | 2/1942 | Graumann | 426/465 |
| 2,877,122 | 3/1959 | Hiller | 426/465 |
| 3,234,869 | 2/1966 | Porambo | 99/407 |
| 3,701,313 | 10/1972 | Boggs | 210/DIG. 8 |

OTHER PUBLICATIONS

Transient Temperature Distribution in Whole Sweet- potato Roots During Immersion Heating, Wodsworth & Spadow, 1969, pages 1-5, Food Technology.

*Primary Examiner*—Samih N. Zaharna
*Assistant Examiner*—Ernest G. Therkorn
*Attorney, Agent, or Firm*—Howard E. Moore; Gerald G. Crutsinger

[57] ABSTRACT

A method and apparatus for cooking food products wherein a plurality of spaced pumps are arranged to circulate fluid over heating elements of different temperatures spaced in successive planes longitudinally of a cooking trough through which the food product is moved. Jets of heated fluid are introduced into the cooking trough to impinge surfaces of the product, the heated fluid being removed from the cooking trough at spaced locations intermediate ends thereof and circulated across the heating elements for introduction back into the trough such that distinct heating zones of different temperature are formed longitudinally of the trough through which the product is moved at a continuous controlled rate. Floating fat and debris pass into an overflow trough extending longitudinally of the cooking trough for delivery to a drain opening.

6 Claims, 10 Drawing Figures

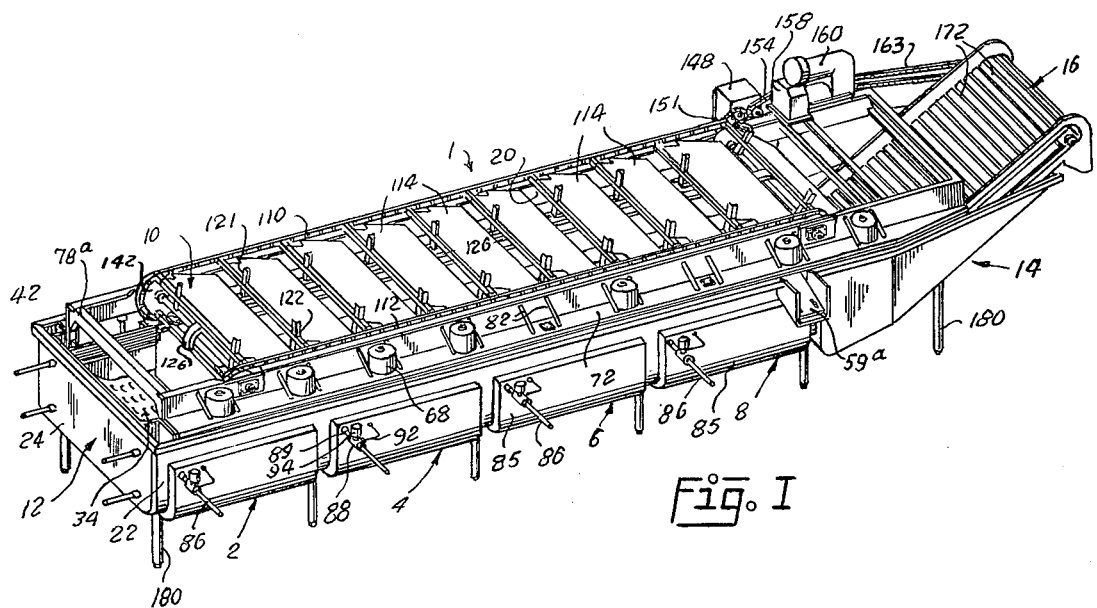

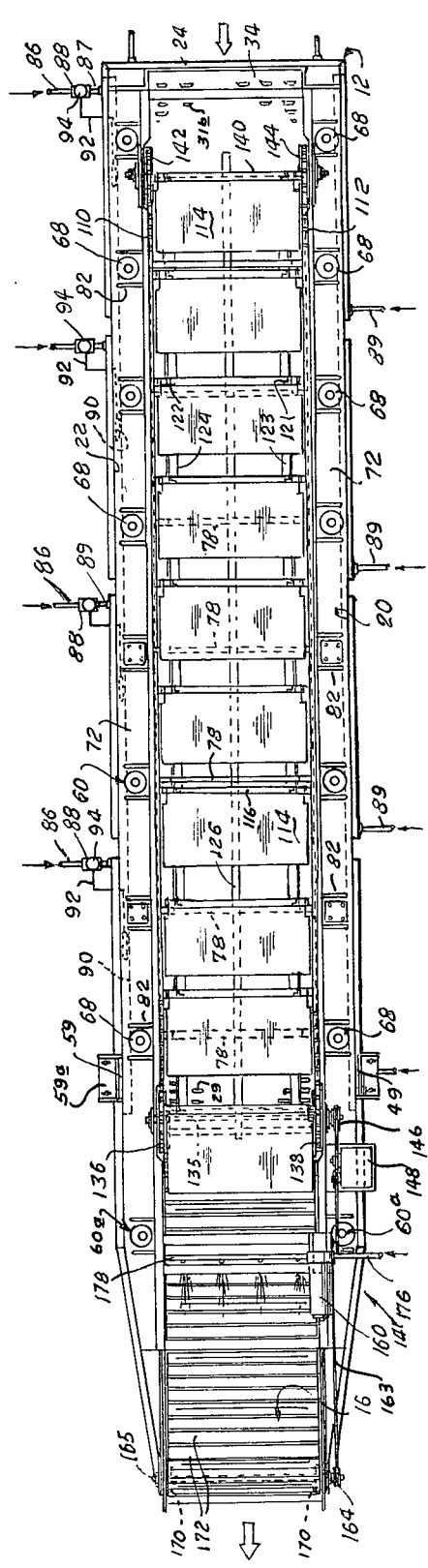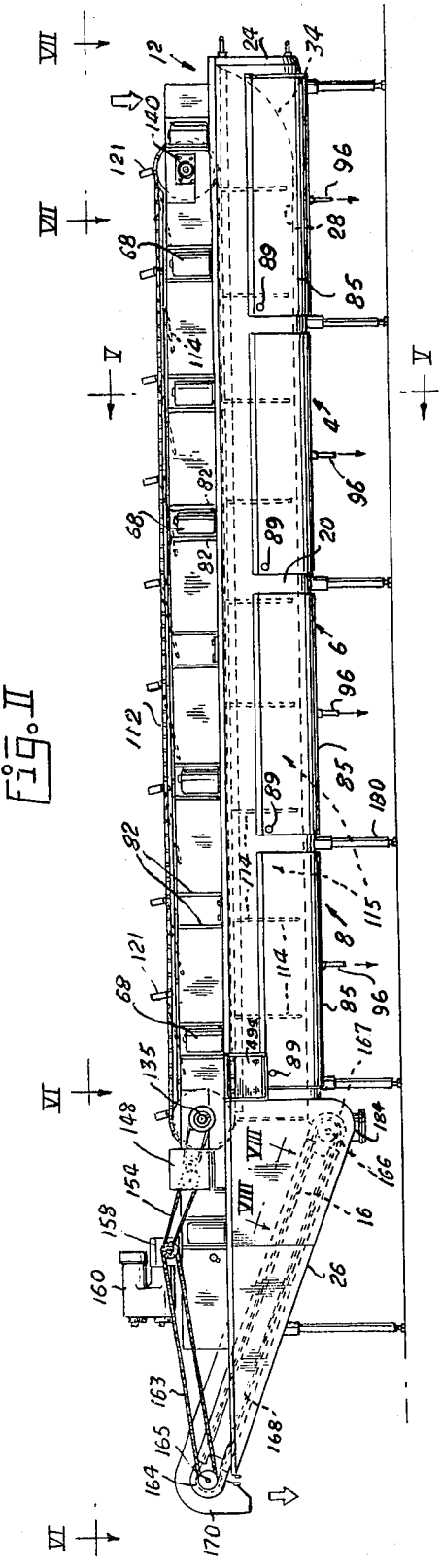

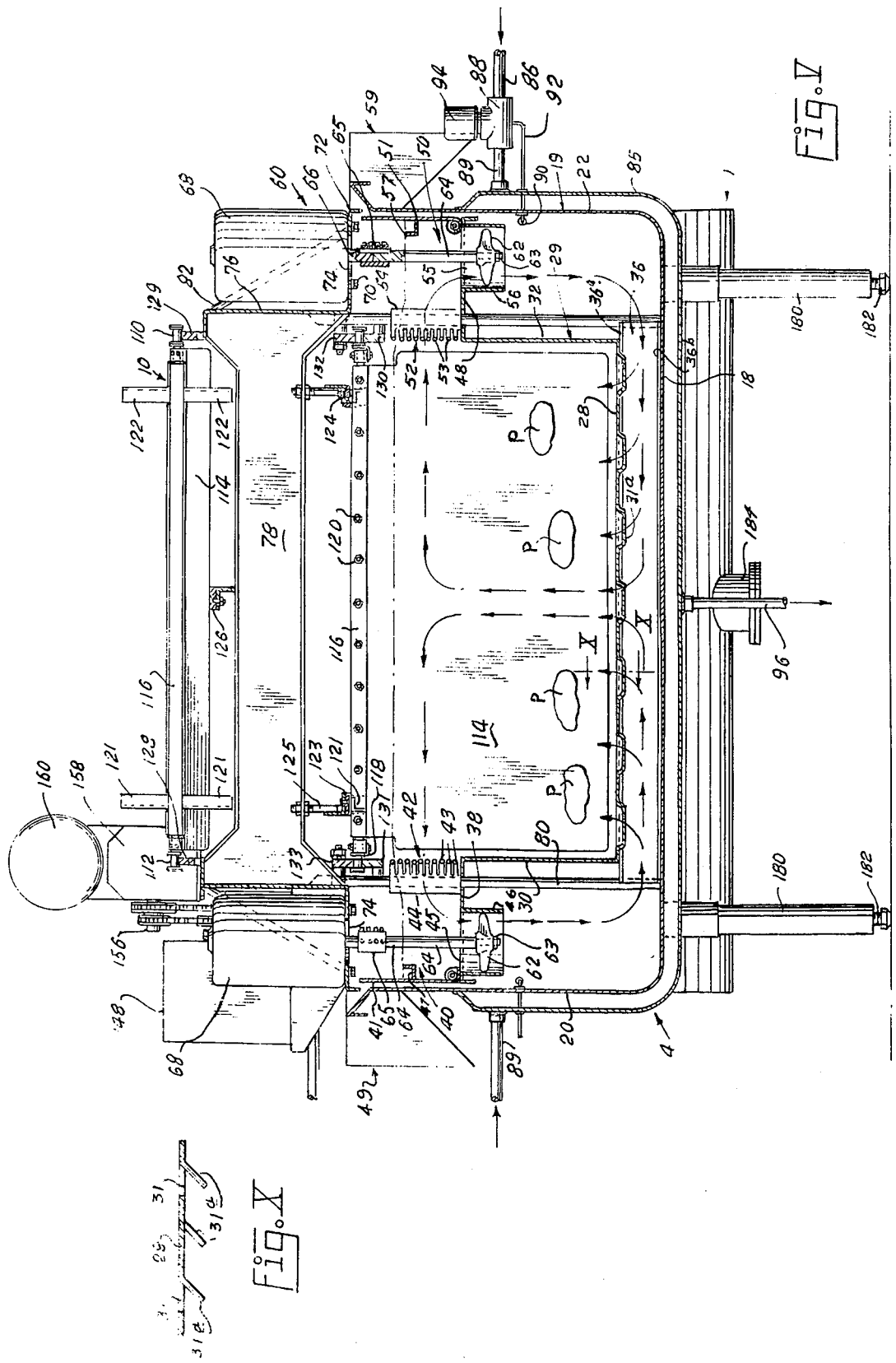

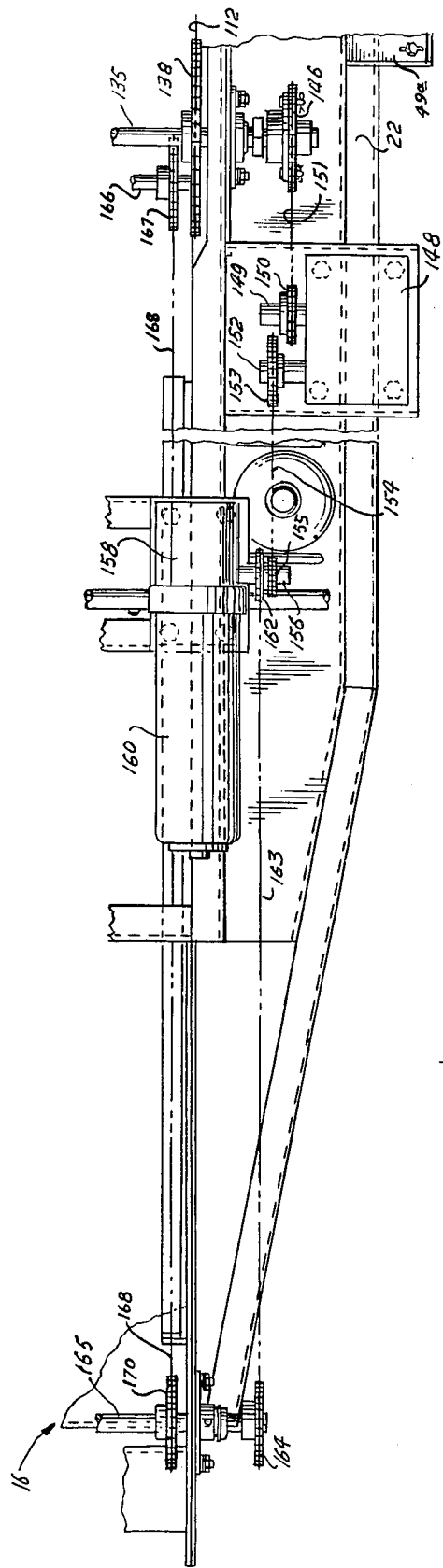
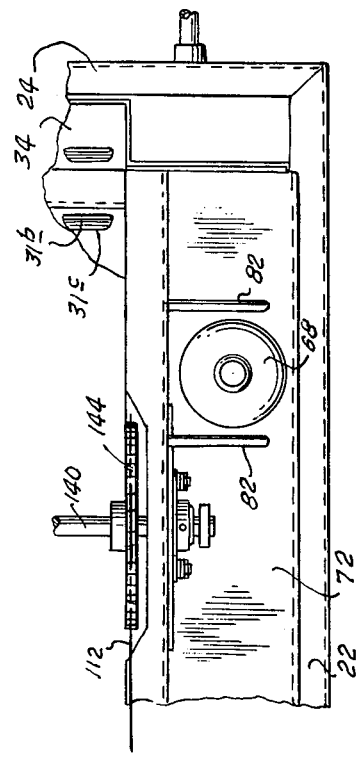
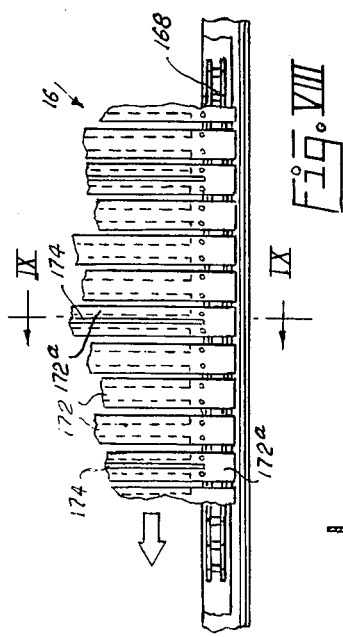
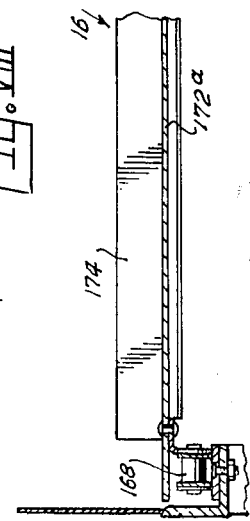

METHOD OF COOKING FOOD PRODUCTS

This is a division of application Ser. No. 209,132, filed Dec. 17, 1971, now U.S. Pat. No. 3,731,614.

BACKGROUND OF INVENTION

Heretofore no cooking apparatus has been devised for processing products such as meat which was capable of cooking large volumes of the product without compromising flavor, tenderness and moisture content thereof.

Food cooking units heretofore devised have employed a long trough filled with heated water cooking oil through which a food product is moved by a suitable conveyor. However, in such devices the fluid is generally pumped into the trough at one end and discharged from the other end thereof, the fluid being disposed of or circulated across a heating element and back into the entry end of the trough. Such devices offer only slight control of the heat transfer rate during stages of cooking as the product is moved from one end of the trough to the other. Consequently, outer portions of the product are often overcooked or center portions are not adequately cooked as the product is moved through the trough.

Other cooking devices heretofore devised have consisted of a trough filled with fluid through which a product is moved by a conveyor, the fluid being heated by heating elements disposed under the trough. Such devices like those which circulate fluid longitudinally of the trough offer inadequate control of temperature and heat transfer rate during the cooking process.

Food cooking apparatus hertofore devised has required substantial labor for maintaining same in a clean sanitary condition because fluid, having fat suspended therein, was generally at a temperature substantially less than the temperature of heating elements to which the fluid was exposed. This temperature gradient resulted in cooking protein, fats and other contaminants onto the hot surfaces creating an unsanitary condition and necessitating cessation of operation periodically for cleaning the tanks.

Since the product was moved by a conveyor, generally comprising paddles or the like carried by a chain, portions of the product tended to accumulate adjacent the paddles and consequently the heat exchange rate between all portions of the product was not uniform. Products dipped in batter were generally pushed along a stationary surface tending to wipe the batter off surfaces of the product and such breaded surfaces of the pieces of the product tended to cook together when urged into contact with breaded surfaces of other pieces.

SUMMARY OF INVENTION

We have developed a method for cooking or otherwise processing a product in a suitable fluid such as water or cooking oil. Temperature is precisely controllable in cooking zones spaced longitudinally of the cooking apparatus. Such is accomplished by providing a plurality of independently controlled heating elements and circulating fluid thereacross transversely to the direction of movement of the product through the cooking device.

The heat transfer rate to the product is precisely controllable in each of the spaced heating zones. Such is accomplished by directing a plurality of jets of heated fluid across surfaces of the product to eliminate formation of stagnant insulating boundary layers of fluid adjacent surfaces of the product which would tend to reduce the heat transfer thereto.

The method is particularly adapted to prevent accumulation of substantial quantities of protein and fat on surfaces of heating units, the flow rate of fluid being sufficiently high that the temperature of fluid delivered to the heating element is not substantially different from that of the heating element. Thus the temperature gradient between the heating element and the fluid is low, being only a few degrees Fahrenheit, to prevent separation of protein from the fluid, and cooking the protein onto walls of the heating element.

Jets of fluid are preferably directed upwardly from the bottom of the trough through which the product is moved creating a hydraulic pressure causing particles or pieces of the product to be suspended in fluid above the bottom of the trough. Such results in substantially uniform heat transfer rates through all parts of the product. The suspended pieces of the product if coated with batter will not be urged together by sufficient force or for sufficient time to cause the pieces to cook together. Furthermore, the suspended particles are not wiped across any stationary surface which might wipe batter from surfaces thereof or damage skin, for example of pieces of chicken.

A primary object of our invention is to provide product cooking method wherein a product is moved at a controlled rate along a trough containing liquid, the temperature of the liquid along the length of the trough being precisely controllable allowing variation in temperature and heat transfer rate along the length of the trough.

A further object of the invention is to provide product cooking method in which portions of the product are suspended in liquid as the product is moved through an elongated trough or container to prevent cooking of parts together and to prevent wiping surfaces thereof against surfaces of the container.

A still further object of the invention is to provide cooking method wherein fluid is circulated upwardly through a perforated conveyor, across the product and subsequently passed means intermediate ends of the cooling apparatus to remove floating fat and particles from the fluid prior to circulating the fluid adjacent a source of heat.

Other and further objects of the invention will become apparent upon referring to the detailed description hereinafter following and the drawings annexed hereto.

DESCRIPTION OF DRAWING

Drawings of a preferred embodiment for carrying out the process of the invention are annexed hereto so that the invention may be better and more fully understood, in which;

FIG. I is a perspective view of the cooking apparatus;

FIG. II is a plan view;

FIG. III is a side elevational view;

FIG. IV is an elevational view of the entry end of cooking apparatus;

FIG. V is a cross-sectional view taken substantially along line V—V of FIG. III;

FIG. VI is an enlarged fragmentary plan view looking in the direction of the arrows along line VI—VI of FIG. III;

FIG. VII is an enlarged fragmentary view looking in the direction of arrows along line VII—VII of FIG. III;

FIG. VIII is an enlarged fragmentary cross-sectional view taken along line VIII—VIII of FIG. III;

FIG. IX is a cross-sectional view taken substantially along line IX—IX of FIG. VIII; and FIG. X is a cross-sectional view taken along line X—X of FIG. V.

Numeral references are employed to designate like parts throughout the various figures of the drawing.

DESCRIPTION OF A PREFERRED EMBODIMENT

Referring to FIG. I of the drawing, the numeral 1 generally designates cooking apparatus comprising a plurality of spaced heating zones 2, 4, 6 and 8 spaced along the length of the cooking apparatus. A conveyor 10 moves pieces of the product, such as chicken parts, from an inlet end 12 of the cooking apparatus toward a discharge end 14. An elevator conveyor 16 is arranged to remove pieces of the product from the cooking apparatus 1 and to deposit same on a suitable conveyor (not shown) for delivery to other processing or packaging apparatus.

As best illustrated in FIGS. I, III and V, a container 19 having a bottom wall 18, spaced side walls 20 and 22, an end wall 24, and an inclined discharge ramp 26 is arranged to allow movement of a paddle longitudinally thereof by conveyor 10 as will be hereinafter more fully explained.

As best illustrated in FIG. V, a trough 29 is disposed inside container 19 and extends longitudinally thereof. Trough 29 comprises side walls 30 and 32 extending upwardly from opposite sides of a perforated bottom wall 28. Container 29 has a perforated end wall 34 adjacent the inlet end 12 of cooking device 1 while the end of trough 29 adjacent the discharge end 14 of the cooking apparatus 1 is open such that parts of a product will be delivered to elevator conveyor 16 as will be hereinafter more fully explained.

As best illustrated in FIGS. V and X, bottom 28 of trough 29 has a plurality of rows of spaced openings 31 extending therethrough formed by deflecting a portion of the bottom wall downwardly to form louvers 31a. Openings 31 preferably comprise less than about thirteen percent of the area of bottom wall 28 and are large enough to avoid blinding by circulating particles.

As best illustrated in FIG. VII, end wall 34 of trough 29 has downwardly deflected louvers 31b about openings 31c for directing fluid longitudinally of the trough adjacent the inlet end 12 thereof.

The bottom wall 28 of trough 29 is spaced above bottom wall 18 of container 19 by a plurality of channel members 36 disposed in spaced apart relation longitudinally of container 19. Channel members 36 have an upper flange 36a welded or otherwise secured to the lower surface of bottom 28 of trough 29 and a lower flange 36b secured to the bottom 18 of container 19. Upper edges of walls 30 and 32 of trough 29 are deflected outwardly to form bottom walls 38 and 48 of fluid return manifolds 40 and 50 extending along opposite sides of trough 29.

Return manifold 40 has a side wall 41 adjacent to the outer side thereof and a grill 42, comprising a plurality of spaced bars 43 secured to suitable support means such as stanchions 44 extending upwardly from the bottom 38 of manifold 40, adjacent the inner side thereof. Bars 43 are spaced apart a distance sufficient to allow substantially unobstructed flow of fluid therethrough while restricting passage of solid material. The bottom wall 38 of fluid return manifold 40 has spaced openings 45 extending therethrough, each of said openings 45 having a conduit 46 secured about the periphery thereof and extending downwardly therefrom.

Side wall 41 has an overflow trough 47 secured thereto and extending therealong, the upper edge of trough 47 being disposed at an elevation substantially equal to the level of fluid in return manifold 40 such that the momentum of floating fat will carry same into the overflow trough 47. The channel in overflow trough 47 communicates with discharge passage 49 having a variable heighth. An adjustable plate 49a has elongated openings through which bolts extend to control discharge through passage 49. Return manifold 50 is similarly constructed having a side wall 51, to which overflow trough 57 is secured, disposed adjacent the outer side thereof and a grill 52 disposed about the inner side thereof. Grill 52 comprises spaced bars 53 supported by spaced stanchion members 54 to allow passage of fluid between said bars. Bottom wall 48 of return manifold 50 has spaced openings 55 extending therethrough and conduits 56 are secured about the periphery of each opening 55, as illustrated in FIG. V.

As best illustrated in FIG. V, impeller means 60 are spaced longitudinally of each return manifold 40 and 50 for circulating fluid downwardly through conduits 46 and 56 as indicated by the arrows, such that fluid is directed upwardly through perforations 31 in the bottom 28 of trough 29, fluid returning through spaces between bars 43 and 53 to the intake side of each impeller 60.

Each impeller 60 is of substantially identical construction comprising a propeller 62 secured by suitable means such as nut 63 to the end of a threaded shaft 64 connected by a suitable coupling 65 to the output shaft 66 of a suitable coupling 65 to the output shaft 66 of a motor 68 which may be adapted to run at a fixed or variable spaced. It should be appreciated that other types of pumping apparatus may be employed in lieu of impeller 60 for circulating fluid in the manner hereinbefore described.

Motor 68 is secured by suitable means such as bolts 70 to a ledge 72 having spaced openings 74 extending therethrough through which output shaft 66 of each motor 68 extends. Ledge 72 is preferably of an angular configuration having an upward extending portion 76 welded or otherwise secured to ends of beams 78, extending transversely across trough 29. Beams 78 are secured to upper ends of spaced stanchions 80 extending upwardly from channel members 36 resting upon the bottom 18 of container 19.

Brace members 82 have upper ends connected adjacent upper edges of upward extending members 76 and have lower ends secured to the horizontally disposed portion of ledge 72 adjacent opposite sides of each motor 68.

Guide means to which conveyor 10 is connected is supported by spaced beams 73 as will be hereinafter more fully explained.

Heating jackets 85 extend about side walls 20 and 22 of container 19 and extend across the lower side thereof in spaced apart relation from bottom wall 18 forming a passage through which a suitable heating medium, such as steam, may be circulated to form heating elements.

A conduit 86 is connectable to a suitable source of heated fluid (not shown), such as steam, and is connected with an inlet passage of valve 88. The outlet passage of valve 88 is connected by a conduit 89 with the inside of heating jacket 85.

Suitable sensing means, adapted to measure the temperature adjacent side walls 20 and 22 of container 19, is operably connected to suitable actuating means for controlling movement of a valve element in valve 88 to control flow of steam from line 86 to conduit 89, thus controlling the quantity of heat delivered to and consequently the temperature of side walls 20 and 22 and bottom wall 18 of container 19 across which fluid is circulated by propeller 62.

Heat sensing apparatus comprises a sensor 90, for example, a resistance thermometer, connected through leads 92 to suitable control apparatus, such as a bridge circuit, adapted to generate a signal to valve actuating means, such as a motor or solenoid 94.

Steam delivered through conduit 89 is moved in heat exchange relation with side walls 20 and 22 of container 19 and passes through an outlet passage in a lower portion of jacket 85 to a return line 96 communicating with a feed line of the steam generator (not shown).

Referring to FIG. III of the drawing, it should be noted that each heating zone 2, 4, 6 and 8 has a separate heating jacket 85 and the flow of steam through each of the heating jackets is individually controlled through individual steam supply conduits 86.

As best illustrated in FIGS. I, III and V, conveyor 10 comprises spaced chains 110 and 112 extending along opposite sides of trough 29 and arranged for moving paddles 114 longitudinally of the trough 29.

As best illustrated in FIG. V paddles 114 are of a size and configuration substantially conforming to the size and configuration of trough 29 and as illustrated in FIG. III the downward extending paddles 114 divide trough 29 into a plurality of spaced compartments into which the product to be cooked may be placed and moved from the entrance end 12 of the cooking apparatus toward the discharge end 14 thereof.

The upper edge of each paddle 114 extends between spaced flanges of a rigid channel member 116 having opposite ends pivotally connected by suitable means such as angle members 118 to chains 110 and 112. Suitable means such as bolts 120 are employed for securing an edge of paddle 114 between flanges of channel member 116. Arms 121 and 122 are welded or otherwise secured in spaced apart relation to channel member 116 intermediate opposite ends thereof. As best illustrated in FIG. V hold-down bars 123 and 124 are secured to beams 78 by suitable means such as bolts 125. When paddles 114 extend downwardly into trough 29 outwardly extending arms 121 and 122 on channel member 116 engage hold-down bars 123 and 124 locking paddles 114 in a lowered position to prevent pivotal movement thereof until the paddle is moved by chains 110 and 112 to a position beyond the ends of the hold-down bars.

A support rail 126 is welded or otherwise secured to a central portion of each beam 78 and extends longitudinally of the cooking apparatus to support the trailing edge of paddles 114 carried by the upper flight of chains 110 and 112 from the discharge end 14 of the cooking apparatus back toward the inlet end 12 thereof.

Chain support rails 128 and 129 extend longitudinally of the cooking apparatus and are arranged to support the return flight of chains 110 and 112 respectively. Chain rails 130 and 131 are secured to stanchions 80 and extend longitudinally of cooking apparatus for supporting lower surfaces of chains 110 and 112 as paddles 114 are moved longitudinally through trough 29. Rails 132 and 133 extend longitudinally of the cooking apparatus and are positioned above upper surfaces of the lower flight of chains 110 and 112 to limit vertical movement of channel member 116 as paddles 114 move longitudinally through the trough 29.

As best illustrated in FIGS. II and III a driven shaft 135 is rotatably secured in suitable bearing means adjacent the discharge end 14 of the cooking apparatus and has sprockets 136 and 138 secured thereto adjacent opposite ends thereof.

An idler shaft 140 is rotatably journaled adjacent the entrance end 12 of the cooking apparatus and has sprockets 142 and 144 secured adjacent opposite ends thereof. Chain 110 extends around sprockets 136 and 142 while chain 112 extends around sprockets 138 and 144.

As best illustrated in FIG. VI the driven shaft 135, adjacent the discharge end 14 of the cooking apparatus, has a sprocket 146 secured adjacent an end thereof. A speed reducer 148 has an output shaft 149 having a sprocket 150 thereon about which a chain 151 extends for driving sprocket 146 to impart rotation to shaft 135. Speed reducer 148 has an input shaft 152 having a sprocket 153 secured thereto about which a chain 154 extends. Chain 154 is driven by a sprocket 155 on shaft 156 of gear box 158 driven by a motor 160.

The output shaft 156 of gear box 158 has a sprocket 162 secured thereto for driving a chain 163 extending around the sprocket 164 secured to driven shaft 165 of elevator conveyor 16.

Elevator conveyor 16 comprises a driven shaft 165, having sprockets 170 thereon, and an idler shaft 166, having a sprocket 167 secured thereto, adjacent the edge of bottom 28 of trough 29 adjacent the discharge end 14 thereof. Chains 168 and 169 extend around sprockets 167 on idler shaft 166 and around sprockets 170 on driven shaft 165.

Slats 172 extend between chains 168 and 169 forming a flexible supporting surface to receive products moved thereonto. Upwardly extending projections 174 are formed on upper surfaces of spaced slats 172a to engage pieces of a product carried thereby to prevent slippage.

The suction side of impeller 60a is connected to draw liquid from space under elevator conveyor 16. Impeller 60a discharges liquid such that flow is downwardly through conveyor 16 to urge pieces of the product into engagement with slats 172 to facilitate discharging pieces from the cooking apparatus.

As best illustrated in FIG. II fluid is discharged from conduit 176 to a spray bar 178 having openings formed therein such that fluid is directed over the surface of the liquid in the trough 29 to skim fat and floating particles into overflow troughs 47 and 57 and toward discharge openings 49 and 59. Spray from spray bar 178 preferably strikes the product as the product breaks through the surface of liquid in trough 29 to wash the product.

The cooking apparatus can be supported by any suitable means such as legs 180 having levelling screws 182 formed therein.

A drain outlet passage 184 is formed in the lowermost part of the bottom of the cooking apparatus to allow drainage of broth or cooking oil therefrom.

OPERATION

The operation and function of the apparatus hereinbefore described is as follows:

Container 19 is filled to a desired level with water, cooking oil or other suitable liquid, and steam is delivered through conduits 86 into steam jackets 85 for heating fluid passing adjacent side walls 20 and 22 of container 19. The temperature of side walls 20 and 22 adjacent each heating zone 2, 4, 6 and 8 is thermostatically controlled and is maintained at a desired temperature level.

When motor 160 is energized power is delivered through driven shaft 135 to rotate chains 110 and 112 thereby moving paddles 114 through trough 29. Products to be cooked are deposited onto the curved surface 34 adjacent the inlet end 12 of the cooking apparatus and jets of water or other heated fluid are directed through slots 31c in the curved bottom 34 adjacent inlet end.

As hereinbefore described each impeller 60 circulates fluid substantially along the path indicated by dashed arrows in FIG. V circulating fluid in heat exchange relation with side walls 20 and 22 and bottom wall 18 of container 19. The heated fluid is directed upwardly through openings 31 in bottom wall 28 of trough 29 such that flow is directed upwardly suspending pieces P of a product above bottom wall 28 of trough 29 to prevent damage to the skin of chicken parts and to prevent scraping of breading from surfaces thereof if such is employed. Such upwardly directed streams also prevent packing of pieces together on the bottom of the trough and adjacent partitions carried by the conveyor.

By controlling the speed of variable speed motor 68 the flow rate of fluid delivered by each impeller 60 can be controlled. Rapid movement of heated fluid across the surface of parts P of the product allows high heat transfer to the parts at lower fluid temperatures resulting in more tender meat and more rapid heating than is accomplished at low flow rates.

The upwardly circulating fluid is drawn through grills 42 and 52. Loose solid material in the fluid, such as fat and small scraps will tend to float across the surface of the fluid and through grill 52. The solid particles on the surface of the horizontally moving fluid will wash over the upper edge of the side wall of overflow trough 57 and will be moved longitudinally thereof to a discharge passage 59 adjacent the discharge end 14 of the cooking apparatus. Passage 59 has an adjustable plate 59a positioned thereacross to allow floating solids in trough 58 to wash over the upper edge thereof and out of the cooking apparatus.

It should be appreciated that since each heating zone 2, 4, 6 and 8 can be maintained at different temperatures and since the flow rate of fluid circulating upwardly and transversely in each heating zone is contollable, both the temperature of fluid and the rate of heat transfer to pieces P of the product in the various zones is controllable.

Since paddles 114 move slowly as compared to the flow rate of fluid, fluid flow longitudinally of trough 29 is substantially negligible.

It should further be appreciated that since the flow rate of fluid is high, the total volume of fluid being moved in heat exchange relation with side walls 20 and 22 heated by steam jackets 85 approximately every 10 seconds, the temperature in each zone is maintained substantially constant and the temperature of the fluid is maintained very close to the temperature of side walls. Thus, protein does not cook onto inner surfaces of side walls 20 and 22 as has been observed in devices heretofore employed for such cooking.

We have found that the cooking apparatus 1, when employed as a deep fat fryer for cooking fried chicken on a continuous basis, should be adjusted such that the temperature of oil in approximately the first one-third of the heating zones should be maintained at a temperature in a range of between 325°F. and 400°F. and oil should circulate (assuming container 19 is filled with 600 gallons of oil) at high flow rate, for example over 200 gallons per minute in each of several pumps in the first one third of the zones. The conveyor speed is adjusted to maintain each piece of chicken in the first one third of the zones for a period of four to five minutes to brown and sear outer portions of each piece. In the succeeded two-thirds of the heating zones, the oil is maintained at a temperature in a range of 200°F.–360°F. and the flow rate of the oil is approximately 100 gallons per minute. Each piece, moved at constant velocity through the cooking apparatus, will remain in the reduced temperature zones from 8 to 12 minutes allowing the center portions of each piece to be brought to a temperature of approximately 190°F.

It should be appreciated that other food products require different cooking temperatures and cooking time to produce optimum results. The above specified time and temperature settings are exemplary for cooking poultry products on a continuous basis. The speed of the conveyor, the temperature of fluid and the flow rate of fluid may be adjusted to provide optimum conditions for processing a specific product for immediate serving or for packaging in suitable containers.

Having described our invention we claim:

1. A method of cooking pieces of a food product comprising the steps of: forming compartments; positioning pieces of food products in each compartment; moving the compartments through a trough containing liquid; circulating liquid heated to a first temperature upwardly through said compartments and across the pieces of the product in a direction transverse to the length of the trough in a first portion of the trough; circulating liquid heated to a second temperature, lower than the first temperature, upwardly through said compartments and across the pieces of the product in a direction transverse to the length of the trough in a second portion of the trough, said first portion and said second portion being spaced from one another along the length of said trough; withdrawing liquid from said compartments in a direction transverse to the length of the trough; and controlling the flow rate and the temperature of the circulating liquid in said first portion and said second portion.

2. The method of claim 1 with the addition of the steps of: controlling the time pieces of the food product are subjected to liquid heated to the first temperature such that outer surfaces of pieces of the food product are browned and seared; and controlling the time the browned pieces of the food product are subjected to liquid heated to said second temperature such that the center of the pieces of the food product are heated to a predetermined temperature.

3. The method of claim 1 with the addition of the step of directing the liquid upwardly at sufficient velocity to suspend the pieces of the product above the bottom of the trough.

4. The method of claim 3 with the addition of the step of removing debris from the liquid at spaced intervals along the length of the trough.

5. The method of claim 3 wherein the liquid contains water.

6. The method of claim 1 wherein the liquid is cooking oil.

* * * * *